No. 768,129. PATENTED AUG. 23, 1904.
E. KEMPSHALL.
COMPOUND SHEET MATERIAL FOR MANUFACTURING GOLF BALLS OR OTHER ARTICLES.
APPLICATION FILED DEC. 16, 1901.
NO MODEL.

Witnesses:
R. W. Pittman
Fred. J. Dole.

Inventor:
Eleazer Kempshall.
By his Attorney
F. A. Richards.

No. 768,129.

Patented August 23, 1904.

UNITED STATES PATENT OFFICE.

ELEAZER KEMPSHALL, OF BOSTON, MASSACHUSETTS, ASSIGNOR TO MANHATTAN MANUFACTURING COMPANY, OF PORTLAND, MAINE, A CORPORATION OF MAINE.

COMPOUND SHEET MATERIAL FOR MANUFACTURING GOLF-BALLS OR OTHER ARTICLES.

SPECIFICATION forming part of Letters Patent No. 768,129, dated August 23, 1904.

Application filed December 16, 1901. Serial No. 86,004. (No specimens.)

*To all whom it may concern:*

Be it known that I, ELEAZER KEMPSHALL, a citizen of the United States, residing in Boston, in the county of Suffolk and State of Massachusetts, have invented certain new and useful Improvements in Compound Sheet Material for Manufacturing Golf-Balls or other Articles, of which the following is a specification.

The object of my present invention is to provide an improved compound or composite material in the form of sheets of substances adapted to be manufactured in part of substances of the celluloid or pyralin class.

Figure 1:
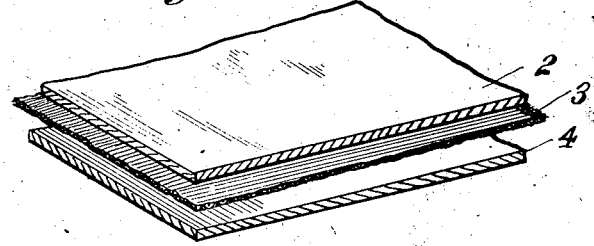
Figure 2:
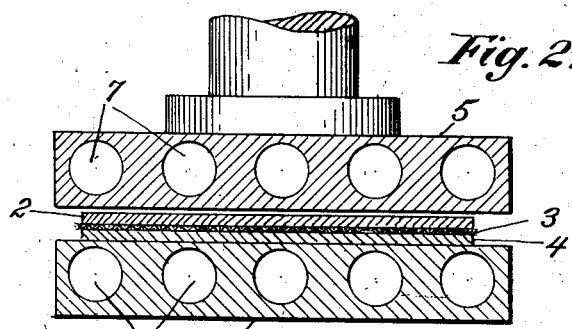
Figure 3:
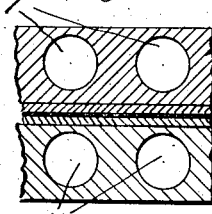
Figure 4:
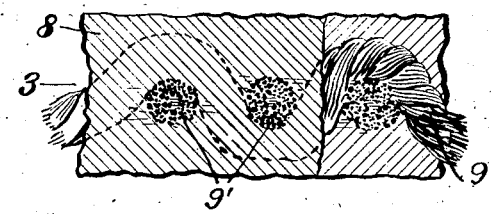
Figure 5:
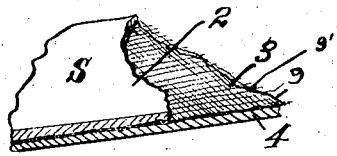

In the accompanying drawings, forming a part of this specification, Figure 1 is illustrative of the preferred manner of carrying out the manufacture of my improved compound sheet material. Fig. 2 illustrates the manner in which the material may be treated for compacting and uniting together the component members or portions thereof. Fig. 3 is a view similar to a portion of Fig. 2, further illustrative of said portion. Fig. 4 is an enlarged and diagrammatic view illustrative of the manner in which the intermediate sheet (designated in a general way by 3) may be combined with celluloid substance in a plastic form, and Fig. 5 shows a portion of the completed material broken away for illustrative purposes.

Similar characters refer to like parts in all the figures.

In carrying out my present invention I apply a fibrous material in sheet form, preferably a woven fabric, to one or more sheets of celluloid or like substance previously suitably prepared for the application thereto of the fibrous sheet or layer and then combine the layers permanently together by the application of a relatively high degree of pressure and heat simultaneously applied to firmly unite and incorporate the sheets and layers in such manner as to produce the required qualities in the composite material for enabling this to be used in making the outer shells or coverings of golf-balls and other articles which are required to have a tough and durable character and at the same time provide for a smooth exterior finish of the article or articles.

In Fig. 2 the sheets 2, 3, and 4 are shown assembled upon each other between a pair of pressing and heating dies or plates, (designated by 5 and 6,) respectively, which plates may have perforations, as 7, for the passage of heating and cooling fluids, these to be applied after the usual manner of heating and cooling forming-dies in the manufacture of rubber and celluloid articles.

In Fig. 3 said dies 5 and 6 are shown brought firmly together, thus compacting and uniting the several sheets between such dies into one moldable sheet, (designated in a general way by S,) which sheet is further represented in Fig. 5.

In Fig. 4 the fabric sheet 3 is indicated by a greatly-enlarged fragmentary portion thereof shown embedded in a relatively large quantity of celluloid material, as 8, which, in the preferred form of my improvement in the manufacture of moldable sheet materials will usually have a relatively plastic character as compared with the preliminarily-prepared sheet or sheets 2 and 4. In some cases only one of the sheets 2 and 4 will be employed. When the fibrous component of the sheet 3 is a woven fabric, the strands of this fabric will usually cross each other, those running in one direction being indicated in Fig. 3 by 9 and those running in the other direction by 9'. This fabric sheet will usually be sufficiently open in the meshes thereof to permit the celluloid substance to pass through the same when subjected to proper treatment.

When the compound material is to be made of a relatively considerable thickness, I provide the celluloid substance in the form of sheets of suitable thickness, and preferably the material in said sheets has eliminated therefrom as a preparatory step in the manufacture of my present improvement the larger part of the solvent originally existing in such material. The said sheets (designated by 2 and 4) may therefore be considered as partially seasoned or in a somewhat "green" condition. The intermediate sheet 3, composed chiefly of the fibrous substance or fabric, is best prepared for use by incorporating therewith a relatively small quantity of celluloid or pyralin substance, which is in a plastic or semiplastic condition, it usually being desirable that this particular sheet of the series of sheets comprising the entire article shall have a somewhat increased amount of solvent as compared with the proportionate amount contained in the other sheet or sheets, so that when the assembled preliminarily-prepared sheets are subjected to heat through pressing-dies—as indicated, for instance, in Fig. 2—the extra amount of solvent contained in the said plastic sheet will act upon the contiguous portions of the sheet or sheets, and so effect a close joining together of the several components or portions of the completed material. At the same time said treatment when applied as indicated and carried to a sufficient extent and intensity operates to further season and solidify the outer sheet or sheets 2 and 4 in connection with the condensing and solidifying of the sheet 3, with the result of producing a compound sheet material or interlined stock that is particularly adapted for use in making the outer shells of golf-balls and like articles requiring a high degree of toughness and stability when subjected to wear and to blows.

The improved material by reason of its peculiar qualities is especially adapted for use in articles requiring a high degree of polish, since the toughness and stability of the material gives it a high degree of security against cracking and abrasion from such treatment as it would ordinarily receive in practical use.

My present improvement has the advantage of furnishing a sheet-form or plate-form material of such a composite construction as to secure a relatively high degree of flexibility in a finished article made therefrom and with a reduced liability to serious injuries from blows as when used in the outer shells of golf-balls or like articles. By reason of the peculiar manner in which in the preferred form of manufacturing said material the several component sheets thereof are combined and united together and by reason in part of the varying conditions of the celluloid substance in the respective layers resulting from such preferred mode of manufacture the finished material is peculiarly adapted for being formed, without destructive effects in any part thereof, into articles of varying conformations produced by subjecting the material to the action of forming-dies of varying sizes and conformations.

When the prepared fibrous sheet 3 is applied between two sheets, such as 2 and 4, and the whole is then combined together by the heating and pressure treatment terminated before the said sheet 3 has the celluloid component thereof entirely seasoned, the resulting sheet material has in the inner part thereof a more ductile and flexible consistency relatively to the outer portions of such completed sheet, and so is peculiarly well adapted for being formed into complex shapes by suitable die treatment, since the subjecting of such material to heat applied through die-pressure tends to soften the inner portion of the completed sheet more than the outer portions thereof, and thus promotes a shifting of the different parts of the entire mass with relation to each other, thereby permitting those various portions to somewhat rearrange themselves, and thus assume a new relation or location that becomes permanent on the further seasoning and cooling of the formed article.

Having thus described my invention, I claim—

1. As an improvement in moldable sheet materials of the celluloid or pyralin class, a plurality of sheets of such substance free of the principal part of solvent originally existing therein, and an intermediate sheet consisting of a fabric incorporated with such substance having a larger proportion of solvent, and the whole being combined into a single moldable sheet through subjection to heat and pressure.

2. As an article of manufacture, a moldable sheet material consisting of two sheets of celluloid substance, and an intermediate sheet consisting of a woven fabric incorporated with a more plastic celluloid substance, the whole being so treated by heat and pressure as to form a compact sheet moldable into new forms when again subjected to heat and pressure.

3. As an article of manufacture, a composite material consisting of outer sheets of the celluloid or pyralin class between which, when the same are in a condition intermediate their "green" condition and the condition which they ultimately assume when fully cured, there is compressed by the aid of heat and pressure a sheet of fabric.

4. As an article of manufacture, a sheet of fabric embedded in the contiguous surfaces of superposed layers of partially-cured or "green" sheets of celluloid or like material.

ELEAZER KEMPSHALL.

Witnesses:
 FRED. J. DOLE,
 H. M. HANKS.